UNITED STATES PATENT OFFICE.

JOSEPH W. RICHARDS, OF SOUTH BETHLEHEM, AND WALTER S. LANDIS, OF BETHLEHEM, PENNSYLVANIA.

PRODUCTION OF PORTLAND CEMENT.

1,073,820.     Specification of Letters Patent.     Patented Sept. 23, 1913.

No Drawing.     Application filed February 28, 1911. Serial No. 611,323.

*To all whom it may concern:*

Be it known that we, JOSEPH W. RICHARDS, a subject of the King of Great Britain, residing at South Bethlehem, county of Northampton, State of Pennsylvania, and WALTER S. LANDIS, a citizen of the United States, residing at Bethlehem, county of Northampton, State of Pennsylvania, have invented certain new and useful Improvements in the Production of Portland Cement; and we do hereby declare the following to be a full, clear, and exact description of the invention, such as will enable others skilled in the art to which it appertains to make and use the same.

The present method of manufacturing Portland cement is to grind very finely, usually to 100 mesh and sometimes to 200 mesh, the raw materials entering into the composition of the cement. These raw materials are usually an argillaceous limestone (called cement, rock) and limestone, or clay and limestone, or marl and limestone, or the usual iron blast-furnace slag and limestone. In every case, it is the invariable practice in making Portland cement to grind these raw materials very fine, as indicated, for the purpose of insuring a homogeneous mixture of the ingredients and a consequent homogeneous fritted product. With this present system of manufacture, in which the product is merely fritted or sintered or clinkered, the homogeneity of the product is absolutely dependent upon the preliminary fine grinding and thorough mechanical mixing of the raw material used. In this ordinary system of manufacture, during the sintering or clinkering operation, usually performed in rotating cylindrical kilns, the constituents of the finely powdered charge combine to produce the material known as cement clinker, which when subsequently very finely ground has the characteristic setting properties of Portland cement. This operation is carried on at a temperature which softens the mixture to such a degree that, in combination with the rotating motion of the kiln, a balling effect (like the rolling or wet snow into snowballs) takes place, and the material issues in small nodular lumps known as cement clinker.

In the ordinary operation thus described, the combination of the cement forming materials is effected by the fine state of division caused by the preliminary grinding of the same, together with the temperature which is just sufficient to make the mixture slightly cohesive and to cause it to roll together into lumps while the kiln is being rotated.

In the system of manufacturing Portland cement which we have devised, the raw materials do not need to be finely ground, but may be and preferably are used in the natural non-pulverized condition, although they may be broken or sized into any convenient form. We thus dispense altogether with the necessary preliminary fine grinding characteristic of the present methods of manufacture. In order to make Portland cement from these raw materials, we charge them into a furnace, preferably a shaft furnace and heat them therein by the combustion of fuel, or by the application of electrical energy, or both, to a temperature sufficient to entirely melt them together, producing a fusion thereof, sufficiently liquid to enable the product to be run from the furnace either continuously, or, if more convenient, to be tapped intermittently from the furnace. This liquidity is the agency upon which we rely to effect the complete and intimate mixture of all the cement forming materials of the charge into a homogeneous product. This product is preferably granulated as it runs from the furnace, as, for instance, by running it into a stream of water, or passing it before a steam or air nozzle. The granulated material when dry and sufficiently cool, is then very finely ground to the fineness requisite to develop therein the characteristic setting properties of Portland cement. We recommend that this grinding be carried to the point where about 85% of the product will pass through a 200 mesh sieve. During the grinding any additions of gypsum or other material usual to add in the final grinding of cement clinker, may be made.

Portland cement is also made at present from ordinary blast furnace slag and limestone as raw materials, as already indicated. Blast furnace slag of itself does not possess the setting properties characteristic of Portland cement, no matter how finely it may be ground. When used as one of the constituents for manufacturing Portland cement the blast furnace slag is very finely ground in admixture with the necessary amount of limestone, and the wellmixed materials are put through a sintering or clinkering process, usually in rotating cement burning kilns. The clinker thus obtained has the chemical composition of Portland cement clinker and, on being finely ground, develops the setting properties of Portland cements. In this operation, the blast furnace slag is practically the equivalent of the natural cement rock used in the ordinary manufacture of Portland cements as previously described. In conformity with the principles of our invention, instead of finely grinding these raw materials (for instance, blast furnace slag and limestone), mixing them and then clinkering the mixture, as is at present done, we charge into the blast furnace itself the necessary proportion of limestone heretofore used for subsequent admixture with the blast furnace slag. We therefore produce at once a slaglike product having the desired composition of Portland cement clinker. This liquid product is then preferably granulated, and ground very fine as before described. Such material is far more highly basic than is the slag produced in the normal running of the blast furnace, and, since its composition corresponds not to blast furnace slag but to Portland cement clinker, it is capable, when finely enough ground, of developing the characteristic setting properties of Portland cement.

It will of course, be understood that the purpose of grinding the liquefied and subsequently solidified slaglike material is to develop within it the characteristic setting properties of Portland cement and that this function will be obtained by similarly comminuting or reducing it in any other equivalent manner known to the art for obtaining a very fine state of sub-division of the particles, as, for instance, by impact pulverization, or the like.

As hereinbefore indicated, any furnace used for reducing iron ores (as, for instance, the blast furnace, or the electric shaft furnace) may be employed for obtaining our improved product as an incident to the reduction of the ore; or the blast furnace, the electric furnace, or any other suitable form of furnace may be used for the sole purpose of producing our liquefied cement-forming material. In those instances where the heat necessary for the liquefaction of the raw materials is produced by the combustion of fuel, the fuel may, according to the type of furnace used, be either admixed with the raw materials so as to constitute a portion of the charge, or the fuel may be carried with the air used, in the form of pulverized coal, or oil or the like, but always under conditions that will result in the complete liquefaction of the raw materials, as hereinbefore fully indicated.

The composition of the cement-forming material thus produced by us in the liquid and afterward solidified condition, corresponds to the composition of Portland cement clinker as it is understood in the industry, viz: a composition of lime, alumina and silica as its essential constituents, the lime predominating.

Having thus described our invention, what we claim is:

The process of making iron and Portland cement in a single furnace operation, which consists in making up the charge of ore in an iron-ore reduction furnace, having a basic lining with the raw materials for producing a lime alumina silicate slag and with excess of limestone sufficient to produce a liquid product having the percentage composition of Portland cement clinker, and generating in said furnace a sufficient temperature to reduce the ore and to cause the clinker to flow from the furnace in the liquid state; substantially as described.

In testimony whereof we affix our signatures, in presence of two witnesses.

JOSEPH W. RICHARDS.
WALTER S. LANDIS.

Witnesses:
HELEN G. HUTH,
DANIEL FRIEBELY.